April 17, 1951    F. E. MOORE    2,549,326
CITRUS FRUIT PEELER
Filed Jan. 25, 1949
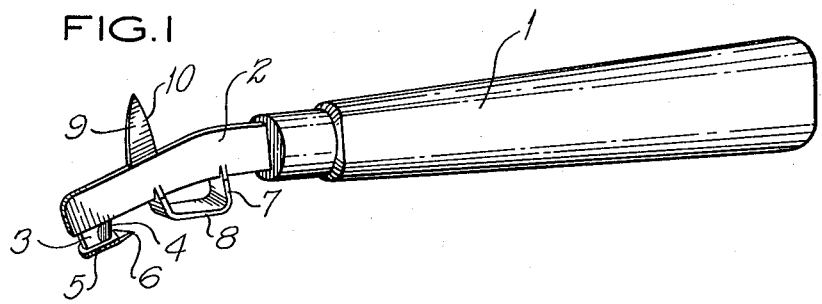
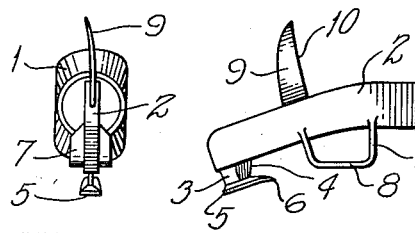
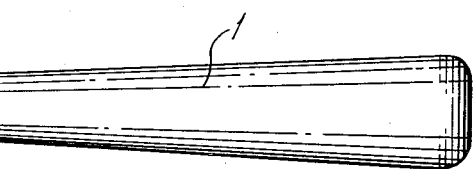
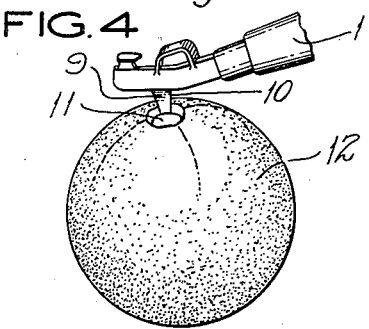
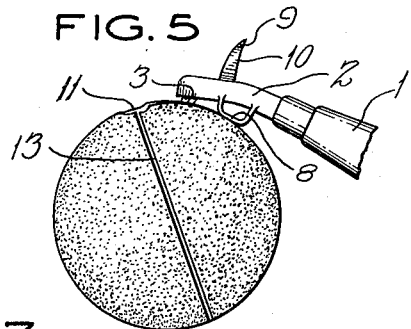
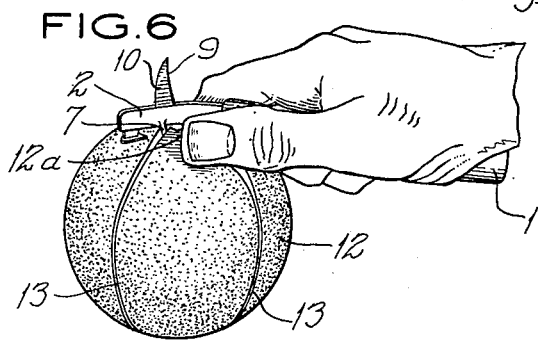
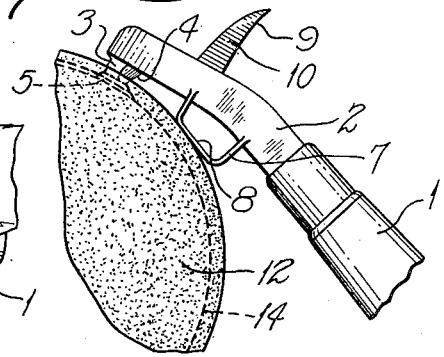
INVENTOR
FRANK E. MOORE
BY C. Jordan Kunik
ATTORNEY Patented Apr. 17, 1951

2,549,326

UNITED STATES PATENT OFFICE 2,549,326

CITRUS FRUIT PEELER

Frank E. Moore, Meriden, Conn.

Application January 25, 1949, Serial No. 72,599

3 Claims. (Cl. 30—24)

My invention relates to improvements in fruit knives and more particularly to an improved device for removing the peel or outer skin from oranges, grapefruit or other citrus fruits.

An object of the invention is to provide a citrus fruit peeler for cutting the outer skin in such a manner that the depth of the cut is controlled.

Another object of the invention is to provide a citrus fruit peeler the cutting blade of which is formed in such a manner that the pulp of the fruit is not injured by the peeling process.

A further object of the invention is to provide a citrus fruit knife having a combination cutter and peeler parts whereby said peeler part serves to guide the operation of the cutter.

Other objects and advantages of the invention will appear as the description of the accompanying drawing proceeds. However, I desire to have it distinctly understood that I do not intend to limit myself to the exact details shown or described, but that I intend to include as part of my invention all such obvious changes and modifications of parts as would fall within the scope of the claims.

My improved form of citrus fruit peeler comprises a shank the free end of which has a comparatively small perpendicular knife blade, said blade being terminated in a flattened out butt portion which serves to travel underneath the skin portion of the fruit and prevents the blade from cutting into the pulp portion of the fruit. There is also provided a guide which is positioned on the same side of the shank as the knife blade and which serves as a pivot area to guide the knife blade as well as to provide a convenient means for lifting away the fruit skins after they have been cut. Another knife blade is also provided on the opposite side of the shank for the purpose of cutting out the small stem portion of the citrus fruit skin in order to allow the butted knife blade to enter the aperture and accomplish its function.

For a fuller understanding of the nature and objects of my invention as well as for specific fulfillment thereof, reference should be had to the following detailed description taken in connection with the accompanying drawing in which:

Figure 1 is a perspective view of a citrus fruit peeler made according to my invention;

Figure 2 is a side elevation of the device shown in Figure 1;

Figure 3 is an end view of Figure 2 showing the cutting blade in end detail; and Figures 4, 5, 6 and 7 are several views showing the operation of my novel device in peeling a citrus fruit.

Similar reference characters refer to similar parts throughout the figures of the drawing.

Figures 1, 2 and 3 show several views of a device embodying my invention which comprises a suitable handle 1 to which is attached a shank 2. At the free end of said shank 2 a comparatively small knife blade 3 is affixed extending perpendicularly to and longitudinally with said shank. A cutting edge 4 is arranged preferably on the handle end of said blade 3, while said blade is provided with a small flat butt 5 preferably having a point 6, said butt being perpendicular to said blade, and said point being disposed rearwardly of said butt. Between blade 3 and handle 1 there is affixed to shank 2 a projection or loop 7 having a flat or slightly rounded surface 8 which serves as a pivot area for knife blade 3. On the shank 2 opposite the side of the pivot loop 7, there is positioned a pointed blade 9 which is perpendicular to the shank, with the edge 10 being sharpened.

In operation, the pointed blade 9 is first used to cut an opening in the stem end 11 of orange 12 as shown in Figure 4, a circular incision being made for this purpose. The orange peeling is then cut into segments by means of blade 3, the cuts 13 being shown in Figure 5. In the partial section of Figure 7, the manner in which the butt 5 limits the depth of the incision made by blade 3 is shown. In addition the cutting action of the device is facilitated by loop 7 which provides a pivot area for the blade 3 as well as guide for defining the direction of making cuts 13. Loop 7 also obviates the necessity of using the thumb as a guide as is required with other fruit peelers.

After the sections are cut, the loop 7 can be used to lift away the ends 12a of the sections of the fruit skin from the fruit as shown in Figure 6. It is thus seen that the peeling of any citrus fruit may be removed without cutting into the pulp of the fruit and the removal of the skin may be quickly effected.

While the present invention, as to its objects and advantages, has been described herein as carried out in a specific embodiment thereof, it is not desired to be limited thereby but it is intended to cover the invention broadly within the spirit and scope of the appended claims.

I claim:

1. A citrus fruit peeler comprising a handle, a shank connected to said handle, a cutting blade attached to the free end of said shank and extending perpendicularly thereto, said blade having a cutting edge disposed toward the handle side of said blade, a flat butt on said blade for preventing the blade from penetrating the pulp of the fruit, and a projection on said shank between said blade and said handle, said projection providing a smooth pivoted surface whereby the cutting action of said blade is controlled.

2. A citrus fruit peeler according to claim 1, wherein said projection is in the form of a loop having a flat surface.

3. A citrus fruit peeler according to claim 1, wherein said butt is provided with a point disposed rearwardly of said butt, said butt being perpendicular to said blade.

FRANK E. MOORE.

REFERENCES CITED

The following references are of record in the file of this patent:

UNITED STATES PATENTS

| Number | Name | Date |
|---|---|---|
| 466,343 | Grant | Jan. 5, 1892 |
| 509,515 | Dietz | Nov. 28, 1893 |
| 1,086,993 | Camanada | Feb. 10, 1914 |
| 1,472,462 | De Port | Oct. 30, 1923 |
| 1,771,296 | Harley et al. | July 22, 1930 |
| 2,258,448 | Gasell | Oct. 7, 1941 |

FOREIGN PATENTS

| Number | Country | Date |
|---|---|---|
| 226,815 | Germany | Oct. 10, 1910 |